United States Patent
Dahroug et al.

(10) Patent No.: US 8,146,386 B2
(45) Date of Patent: Apr. 3, 2012

(54) CONSTANT FORCE SCORING DEVICE AND METHOD FOR USING SAME

(75) Inventors: Mohamed Dahroug, Painted Post, NY (US); Scott Winfield Deming, Elmira, NY (US); Michael Albert Joseph, II, Corning, NY (US); Thomas Achille Yorio, Painted Post, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/237,332

(22) Filed: Sep. 20, 2011

(65) Prior Publication Data

US 2012/0006058 A1 Jan. 12, 2012

Related U.S. Application Data

(62) Division of application No. 11/801,212, filed on May 9, 2007, now Pat. No. 8,051,681.

(51) Int. Cl.
*C03B 33/02* (2006.01)
(52) U.S. Cl. .................. 65/97; 65/174; 83/879; 83/881
(58) Field of Classification Search ............... 65/56, 70, 65/87, 90–94, 97, 174; 83/861, 879, 881, 83/880, 886, 887
See application file for complete search history.

(56) References Cited

U.S. PATENT DOCUMENTS

| | | | | |
|---|---|---|---|---|
| 1,339,141 | A | * | 5/1920 | Sharpnack .................. 285/325 |
| 3,338,696 | A | | 8/1967 | Dockerty |
| 3,682,609 | A | | 8/1972 | Dockerty |
| 3,880,028 | A | * | 4/1975 | Frederick, Jr. ................. 83/880 |
| 4,133,233 | A | | 1/1979 | Pearl ................................. 83/56 |
| 4,137,803 | A | * | 2/1979 | Goldinger ....................... 83/881 |
| 4,204,445 | A | * | 5/1980 | Goldinger ....................... 83/880 |
| 4,213,550 | A | * | 7/1980 | Bonaddio ......................... 225/2 |
| 4,226,153 | A | * | 10/1980 | Insolio ............................ 83/881 |
| 4,291,824 | A | * | 9/1981 | DeTorre ............................ 225/2 |
| 4,412,700 | A | | 11/1983 | Zitz et al. ....................... 299/1.8 |
| 4,494,444 | A | * | 1/1985 | Masse ............................. 83/886 |
| 4,511,386 | A | | 4/1985 | Kellar et al. ................... 65/273 |

(Continued)

FOREIGN PATENT DOCUMENTS

EP 0740986 11/1996

(Continued)

OTHER PUBLICATIONS

K.K. Oh, et al., "Optimal Design of a Micro Parallel Positioning Platform. Part II: Real Machine Design," Robotica, 2005, vol. 23, pp. 109-122.

*Primary Examiner* — Matthew Daniels
*Assistant Examiner* — Yana Belyaev
(74) *Attorney, Agent, or Firm* — Kevin M. Able

(57) ABSTRACT

A scoring device is described herein that applies a constant force while scoring a piece of material so that there is a consistent score quality (or vent depth) within the scored piece of material. In one embodiment, the piece of material is a bowed shaped glass sheet that is supported by a conformable nosing device which has been configured to have a bowed shape that substantially matches the bowed shape of the glass sheet.

7 Claims, 7 Drawing Sheets

U.S. PATENT DOCUMENTS

| | | | |
|---|---|---|---|
| 5,038,654 A * | 8/1991 | Mackey | 83/880 |
| 5,154,334 A | 10/1992 | Dekker et al. | 225/2 |
| 5,634,388 A | 6/1997 | Fuchigami et al. | 83/881 |
| 5,860,349 A | 1/1999 | Takeda | 83/881 |
| 5,865,576 A | 2/1999 | Arai et al. | 409/201 |
| 6,247,625 B1 | 6/2001 | Chakrabarti et al. | 225/96.5 |
| 6,269,994 B1 | 8/2001 | Harrington | 225/96.5 |
| 6,460,258 B1 | 10/2002 | Shimotoyodome | 33/18.1 |
| 6,536,121 B1 | 3/2003 | Ishikawa et al. | 33/18.1 |
| 6,616,025 B1 | 9/2003 | Andrewlavage, Jr. | 225/96.5 |
| 6,832,439 B2 | 12/2004 | Ishikawa | 33/18.1 |
| 6,901,677 B2 | 6/2005 | Smith et al. | 33/551 |
| 7,260,959 B2 | 8/2007 | Chang et al. | 65/25.3 |
| 2003/0047538 A1 | 3/2003 | Trpkovski | 216/84 |
| 2004/0154456 A1 | 8/2004 | Wakayama et al. | 83/880 |
| 2004/0187523 A1 * | 9/2004 | Cox | 65/158 |
| 2006/0042315 A1 * | 3/2006 | Chang et al. | 65/25.3 |
| 2006/0163306 A1 * | 7/2006 | John et al. | 225/4 |
| 2006/0255083 A1 * | 11/2006 | Bonaddio et al. | 225/2 |
| 2006/0261118 A1 | 11/2006 | Cox et al. | 225/96 |
| 2007/0039990 A1 * | 2/2007 | Kemmerer et al. | 225/2 |

FOREIGN PATENT DOCUMENTS

| | | |
|---|---|---|
| EP | 740986 A1 * | 11/1996 |
| GB | 1339141 | 8/1971 |
| JP | 10158022 | 6/1998 |
| JP | 2008019102 | 1/2008 |

* cited by examiner

CONSTANT FORCE SCORING DEVICE AND METHOD FOR USING SAME

CROSS REFERENCE TO RELATED APPLICATION

This is a divisional of U.S. patent application Ser. No. 11/801,212 filed on May 9, 2007, now U.S. Pat. No. 8,051,681 the content of which is relied upon and incorporated herein by reference in its entirety, and the benefit of priority under 35 U.S.C. §120 is hereby claimed.

TECHNICAL FIELD

The present invention relates to a scoring device that applies a constant force while scoring a piece of material so that there is a consistent score quality (or vent depth) within the scored piece of material. In one embodiment, the piece of material is a bowed shaped glass sheet that is supported by a conformable nosing device which has been configured to have a bowed shape that substantially matches the bowed shape of the glass sheet.

BACKGROUND

A scoring device which includes a score wheel is commonly used in the glass industry to score a glass sheet so that the glass sheet can be broken into a desired shape. An exemplary scoring device used today to score a glass sheet includes a score wheel mounted on a ball bearing pivot which is secured to a shaft which is in turn mounted on a linear actuator (air cylinder) that moves the score wheel towards the glass sheet so it can be drawn across and score the side of the glass sheet. An issue with this particular scoring device is that the scoring pressure between the score wheel and the glass sheet varies as the score wheel moves along the side of the glass sheet because of variations in the thickness of the glass sheet, the flatness of the glass sheet and the position of the glass sheet. This causes an inconsistent scoring quality (e.g., vent depth) and a variable scoring force along the score line within the glass sheet. If the scoring force is too high, then that can cause a lateral crack (or chip) along the score line within the glass sheet. If the scoring force is too low, then that can cause vent loss which can adversely affect the separation of the scored glass sheet. Another issue with this particular scoring device is that large glass chips are created by the "cutter in" motion of the linear actuator (air cylinder) where the score wheel is moved towards and first makes contact with the surface of the glass sheet. The presence of these large glass chips can adversely affect the rotation of the score wheel on the glass sheet. Accordingly, there is a need for a new scoring device that can address these shortcomings and other shortcomings which are associated with this particular scoring device and other commonly known scoring devices. These needs and other needs are satisfied by the scoring device and scoring method of the present invention.

SUMMARY

The present invention provides a scoring device that is capable of applying a pre-set and a regulated scoring force while scoring a glass sheet so that there is a consistent score quality (or vent depth) within the scored glass sheet. In one embodiment, the scoring device includes: (a) a score wheel; (b) a horizontal linear motor/actuator that moves the score wheel in an X-direction along a side of a glass sheet; (c) a coarse vertical linear motor/actuator that moves the score wheel in a Y-direction towards the side of the glass sheet; (d) a fine vertical linear motor/actuator (or voice coil actuator) that moves the score wheel in the Y-direction even closer towards the side of the glass sheet; and (e) a ranging sensor. In operation, the ranging sensor functions to obtain positional information about a location of the side of the glass sheet so that the horizontal linear motor/actuator, the coarse vertical linear motor/actuator and the fine vertical linear motor/actuator can be moved such that the score wheel remains at a substantially constant distance from the side of the glass sheet which enables the score wheel to be extended so as to apply a substantially constant scoring force while the score wheel moves along and scores the side of the glass sheet. In addition, the present invention provides a glass manufacturing system and a method which uses the scoring device to produce a glass sheet.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
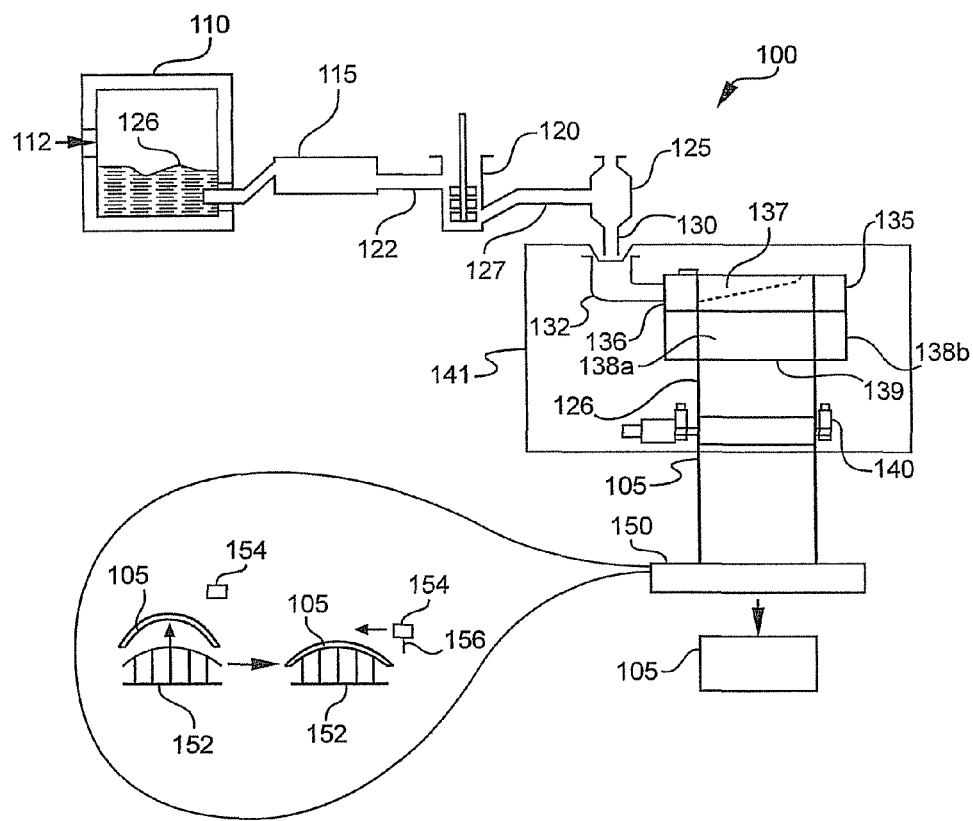
FIG. 1 is a schematic view of an exemplary glass manufacturing system that is utilizing a scoring device in accordance with the present invention.

Referring to FIG. 1, there is shown a schematic view of an exemplary glass manufacturing system 100 which is utilizing a scoring device 154 in accordance with the present invention. The glass manufacturing system 100 includes a melting vessel 110, a fining vessel 115, a mixing vessel 120 (e.g., stir chamber 120), a delivery vessel 125 (e.g., bowl 125), a fusion draw machine (FDM) 141 and a traveling anvil machine (TAM) 150. The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127.

The delivery vessel 125 delivers the molten glass 126 through a downcomer 130 into the FDM 141 which includes an inlet 132, a forming vessel 135 (e.g., isopipe 135), and a pull roll assembly 140. As shown, the molten glass 126 from the downcomer 130 flows into the inlet 132 which leads to the forming vessel 135 (e.g., isopipe 135). The forming vessel 135 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140 to form the glass sheet 105.

The pull roll assembly 140 delivers the drawn glass sheet 105 (which at this point in the process has a curved/bowed shape) to the TAM 150 which includes a conformable nosing device 152 and the scoring device 154 that are used to score and separate the bowed glass sheet 105 into distinct pieces of glass sheets 105. The conformable nosing device 152 is setup to have a bowed shape that substantially matches the bowed shape of the glass sheet 105 (see the enlarged top view of the TAM 150 illustrated in FIG. 1). Then, the conformable nosing device 152 is moved so as to engage one side of the bowed glass sheet 105 after which the scoring device 154 extends a score wheel 156 that scores the exposed side of the bowed glass sheet 105 (see the aforementioned U.S. patent application Ser. No. 11/801,213 for a detailed discussion about the structure and function of the conformable nosing device 152). After scoring, the bowed glass sheet 105 is bent in a direction perpendicular to the curved surface and separated to create a smaller glass sheet 105 which is shown located below the TAM 150. A detailed discussion about the basic components and the basic function of the scoring device 154 is provided next with respect to FIGS. 2-7.

Figure 2:
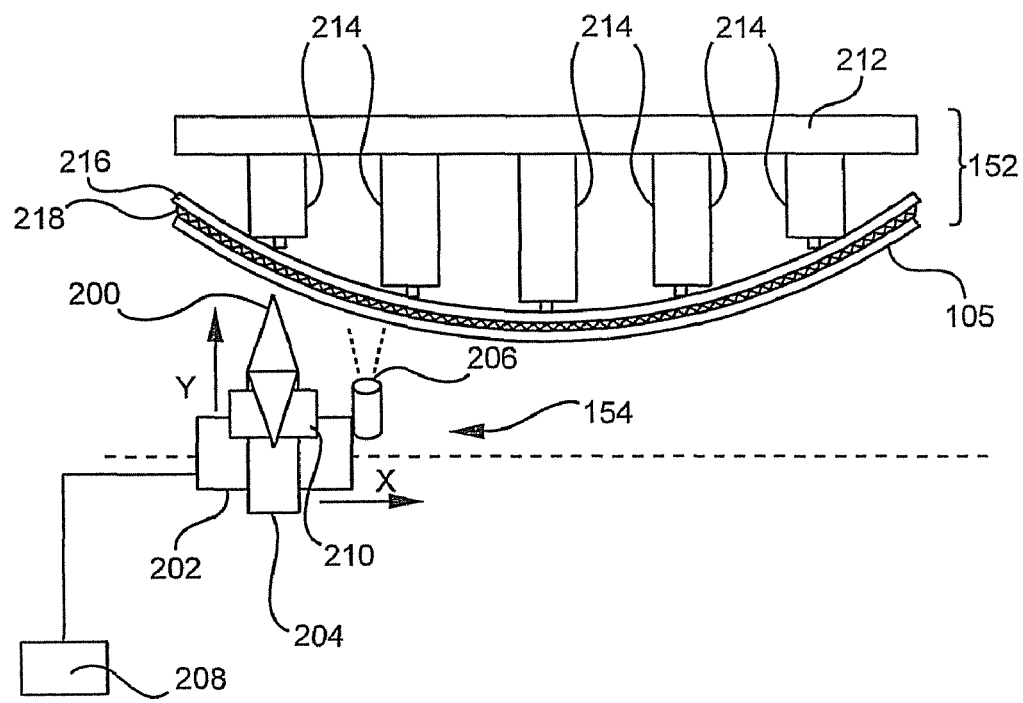
FIG. 2 is a block diagram illustrating the basic components of the scoring device in accordance with the present invention.
Figure 3A:
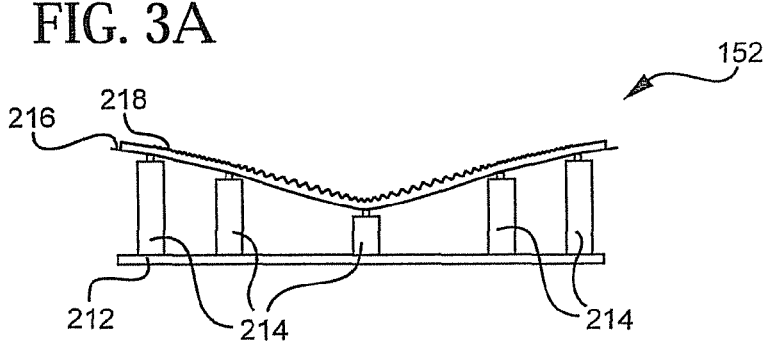
FIGS. 3A-3E are diagrams which illustrate some of the different shapes a glass sheet can have while it is being scored by the scoring device in accordance with the present invention.
Figure 3B:
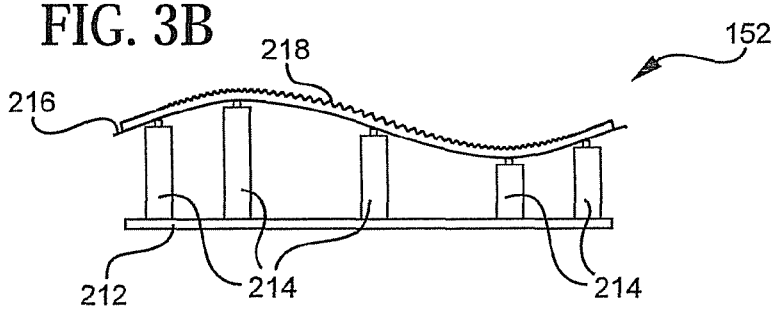
Figure 3C:
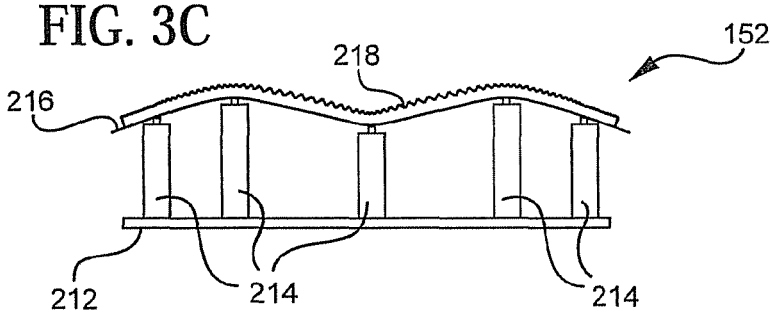
Figure 3D:
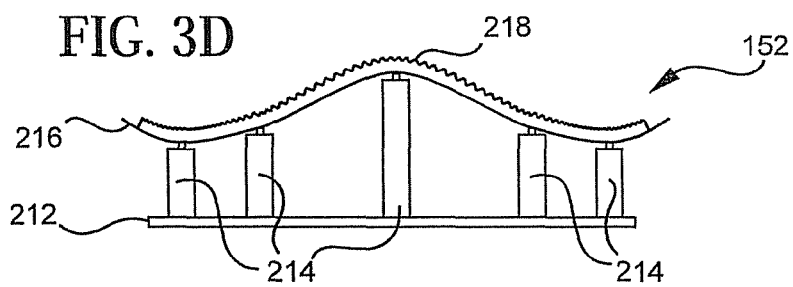
Figure 3E:
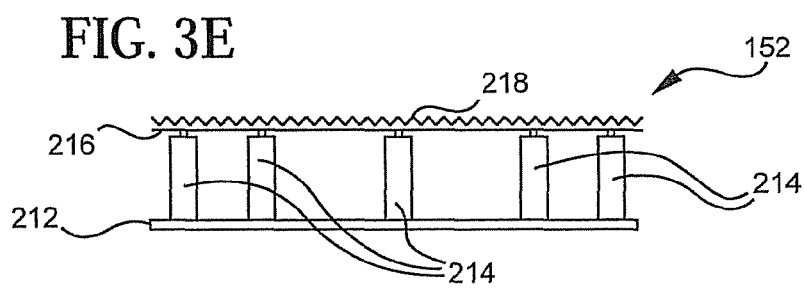

Referring to FIG. 2, there is a diagram illustrating the basic components of the scoring device 154 which is shown located next to the bowed glass sheet 105 that is being supported by the conformable nosing device 152. The scoring device 154 includes: (1) a score wheel 200; (2) a horizontal linear motor/actuator 202 (which moves the score wheel 200 in an X-direction along a side of the glass sheet 105); (3) a vertical linear motor/actuator 204 (which moves the score wheel 200 in a Y-direction towards the glass sheet 105); and (4) a ranging sensor 206. In operation, the ranging sensor 206 (e.g., laser sensor 206) obtains positional information about a location of the side of the glass sheet 105 during the scoring process and provides that positional information to a computer/controller 208. The computer/controller 208 instructs the horizontal linear motor/actuator 202 and the vertical linear motor/actuator 204 to both move so that the score wheel 200 follows the contour of the bowed glass sheet 105. At the same time, the computer/controller 208 instructs a device 210 (e.g., low friction pneumatic actuator 210, voice coil actuator 210) to extend the score wheel 200 so it can apply a substantially constant scoring force while it is moving and scoring the side of the glass sheet 105 (note: the constant force scoring can help reduce waste in production by optimizing the life of the score-wheel 156).

In this example, the scoring device 154 is shown scoring a bowed glass sheet 105 (a positive bell shaped glass sheet 105 which is common with Gen 5 glass sheets 105) that is being supported by the conformable nosing device 152 that has been set up to have a shape that substantially matches the shape of the bowed glass sheet 105. Alternatively, the glass sheet 105 can have any one of a wide variety of shapes during a manufacturing process and the conformable nosing device 152 can be set up to have a shape that corresponds with the particular shape of the glass sheet 105. For example, the conformable nosing device 152 has a support bracket 212 securing one of the ends of an array of extendable elements 214 which is setup such that a flexible beam 216 (with a nosing material 218 applied thereto) has any one of the following configurations: (1) the negative bell shape (see FIG. 3A—this shape is common with Gen 5 glass sheets 105); (2) the S-shape (see FIG. 3B—this shape is common with Gen 7 glass sheets 105); (3) the M-shape (see FIG. 3C—this shape is common with Gen 7 glass sheets 105); (4) the W-shape (see FIG. 3D—this shape is common with Gen 7 glass sheets 105); and the flat-shape (see FIG. 3E—this shape is common with glass sheets 105 that are scored on a substantially flat nosing device) (note 1: very large GEN glass sheets, i.e. 8, 9, & 10, that have an increased tendency for "S", "W", "M" bows can be easily scored by the constant force scoring device 154) (note 2: the start-up time to produce large GEN glass sheets may be reduced as the constant force scoring device 154 can tolerate a wide range of glass shapes found during the start-up process) (note 3: future applications with specially curved glass which have curves greater than the typical bows observed today could be easily scored by the constant force scoring device 154).

Figure 4:
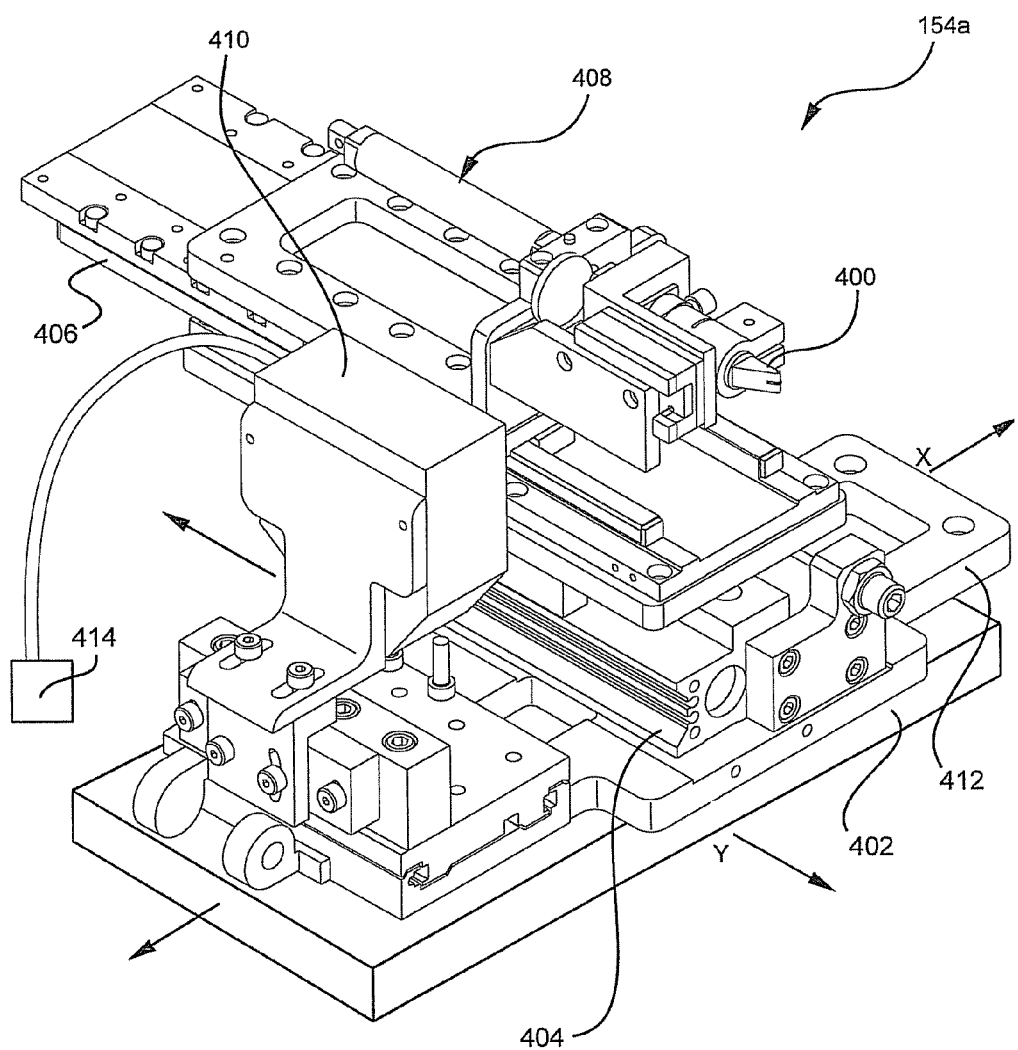
FIG. 4 is a perspective view of a scoring device that is configured in accordance with a first embodiment of the present invention.

Referring to FIG. 4, there is a diagram which illustrates in greater detail the basic components of an exemplary scoring device 154a that is configured in accordance with a first embodiment of the present invention (note: the glass sheet 105 is not shown but it should be appreciated that under a normal operating condition it would be located in front of the score wheel 400 on the scoring device 154a). This exemplary scoring device 154a includes: (1) a score wheel 400; (2) a horizontal linear motor/actuator 402 (which moves the score wheel 400 in an X-direction along a side of the glass sheet 105); (3) a coarse vertical linear motor/actuator 404 (which moves the score wheel 400 in a Y-direction towards the glass sheet 105); (4) a fine vertical linear motor/actuator 406 (which moves the score wheel 400 in the Y-direction so it is even closer to the glass sheet 105); (5) a low friction pneumatic actuator 408 (which extends the score wheel 400 so that it is able to apply a substantially constant scoring force while it is scoring a side of the glass sheet 105); and (6) a ranging sensor 410. As can be seen, these components 400, 402, 404, 406, 408 and 410 are all mounted onto and secured to a frame 412.

Figure 5:
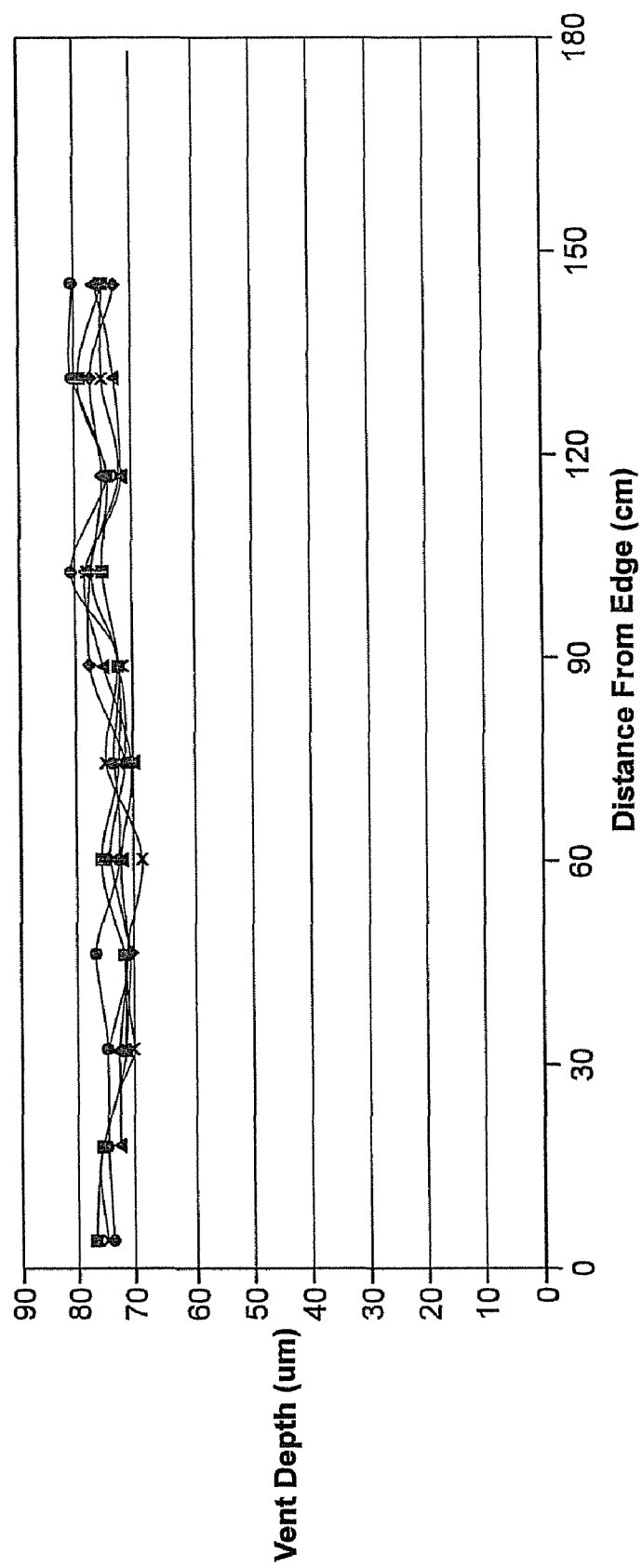
FIG. 5 is a graph which illustrates the consistent and desirable vent depth ($\mu m$) that was obtained when a Gen 6 glass sheet with a 30 mm bow was scored at 1 m/second by the scoring device shown in FIG. 4 in accordance with the present invention.

In operation, the ranging sensor 410 (e.g., laser sensor 410) obtains positional information about a location of the side of the glass sheet 105 during the scoring process and provides that positional information to a computer/controller 414 (note: the laser sensor 410 can be manufactured by the KEYENCE Corporation (model no. KEYENCE-LKG Series). Then, the computer/controller 414 instructs the horizontal linear motor/actuator 402, the coarse vertical linear motor/actuator 404 and the fine vertical linear motor/actuator 406 to all move so that the score wheel 400 follows the contour of the bowed glass sheet 105 (note: the coarse vertical linear motor/actuator 404 can be manufactured by the SMC Corporation (model no. SMC-MXS20-50A) and the fine vertical linear motor/actuator 406 can be manufactured by the Parker Hannifin Coporation (model no. PARKER-MX80L-TO4)). At the same time, the computer/controller 414 instructs the low friction pneumatic actuator 408 to extend the score wheel 400 such that it is able to apply a substantially constant scoring force while it moves and scores the exposed side of the glass sheet 105 (note: the low friction pneumatic actuator 408 can be manufactured by the AIRPOT Corporation (model no. AIRPOT-915U)). FIG. 5 is a graph which illustrates the consistent and desirable vent depth (μm) that was obtained when a 30 mm bowed Gen 6 glass sheet 105 (supported by the conformable nosing device 152) was scored at 1 m/second by the scoring device 154a (note: when the constant scoring device 154a was not used then a significant vent depth variation was observed in the scored glass sheet).

Figure 6:
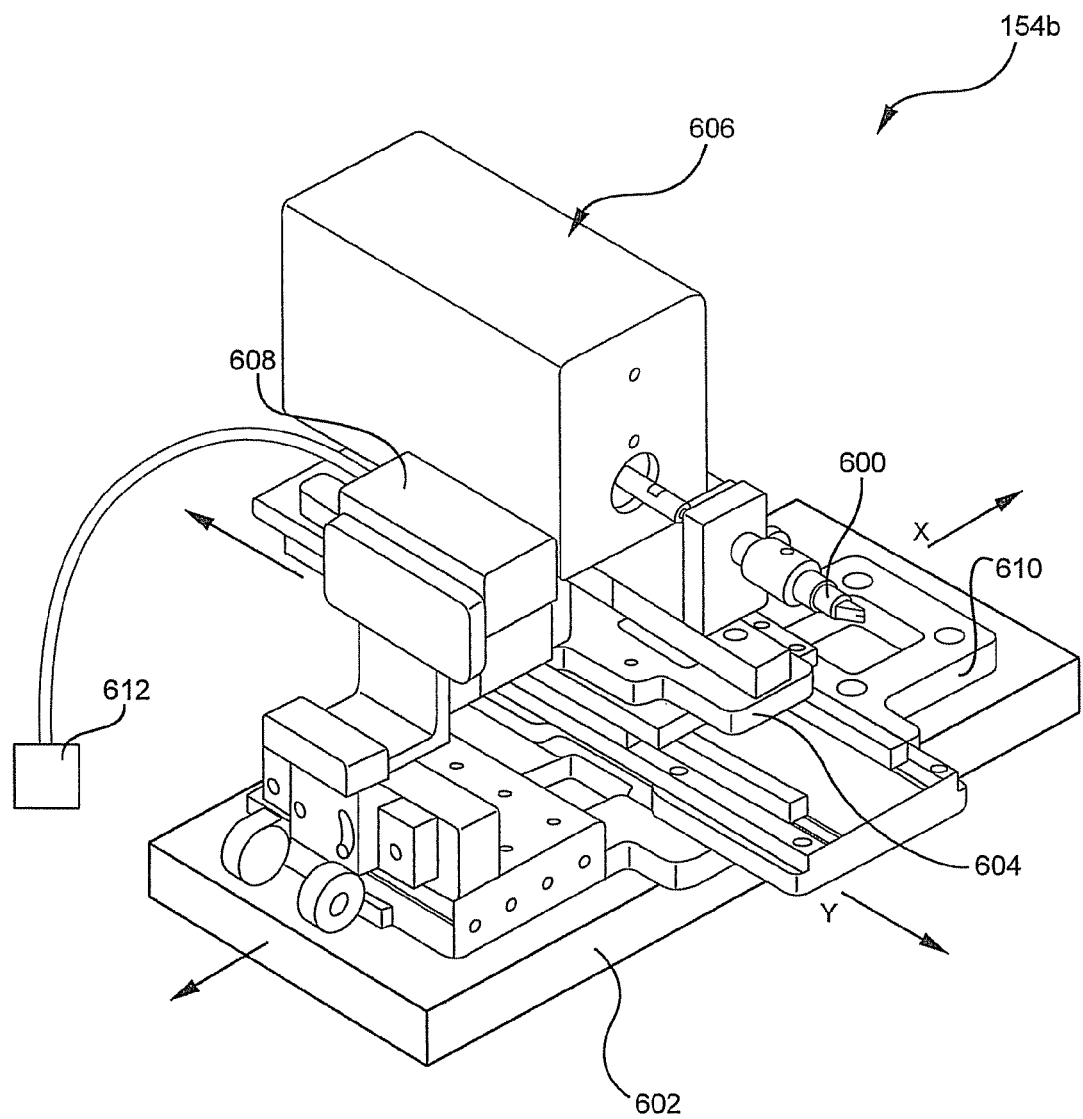
FIG. 6 is a perspective view of a scoring device that is configured in accordance with a second embodiment of the present invention.

Referring to FIG. 6, there is a diagram which illustrates in greater detail the basic components of an exemplary scoring device 154b that is configured in accordance with a second embodiment of the present invention (note: the glass sheet 105 is not shown but it should be appreciated that under a normal operating condition it would be located in front of the score wheel 600 on the scoring device 154b). This exemplary scoring device 154b includes: (1) a score wheel 600; (2) a horizontal linear motor/actuator 602 (which moves the score wheel 600 in an X-direction along a side of the glass sheet 105); (3) a coarse vertical linear motor/actuator 604 (which moves the score wheel 600 in a Y-direction towards the glass sheet 105); (4) a voice coil actuator 606 (which functions like a fine vertical linear motor/actuator and moves the score wheel 600 in the Y-direction so it is even closer to the glass sheet 105 and also functions to extend the score wheel 600 such that it is able to apply a substantially constant scoring force while it is scoring a side of the glass sheet 105); and (5) a ranging sensor 608. As can be seen, these components 600, 602, 604, 606 and 608 are all mounted onto and secured to a frame 610.

In operation, the ranging sensor 608 (e.g., laser sensor 608) obtains positional information about a location of the side of the glass sheet 105 during the scoring process and provides that positional information to a computer/controller 612 (note: the laser sensor 608 can be manufactured by the KEYENCE Corporation (model no. KEYENCE-LKG Series). Then, the computer/controller 612 instructs the horizontal linear motor/actuator 602, the coarse vertical linear motor/actuator 604 and the voice coil actuator 606 to all move or operate so that the score wheel 600 follows the contour of the bowed glass sheet 105 (note: the coarse vertical linear motor/actuator 604 can be manufactured by the SMC Corporation (model no. SMC-MXS20-50A) and the voice coil actuator 606 can be manufactured by the SMAC Inc. and have a model number SMAC-LAL95-50-53)). At the same time, the computer/controller 612 instructs the voice coil actuator 606 to extend the score wheel 600 such that it is able to apply a substantially constant scoring force while it is moving and scoring the exposed side of the glass sheet 105.

Figure 7:
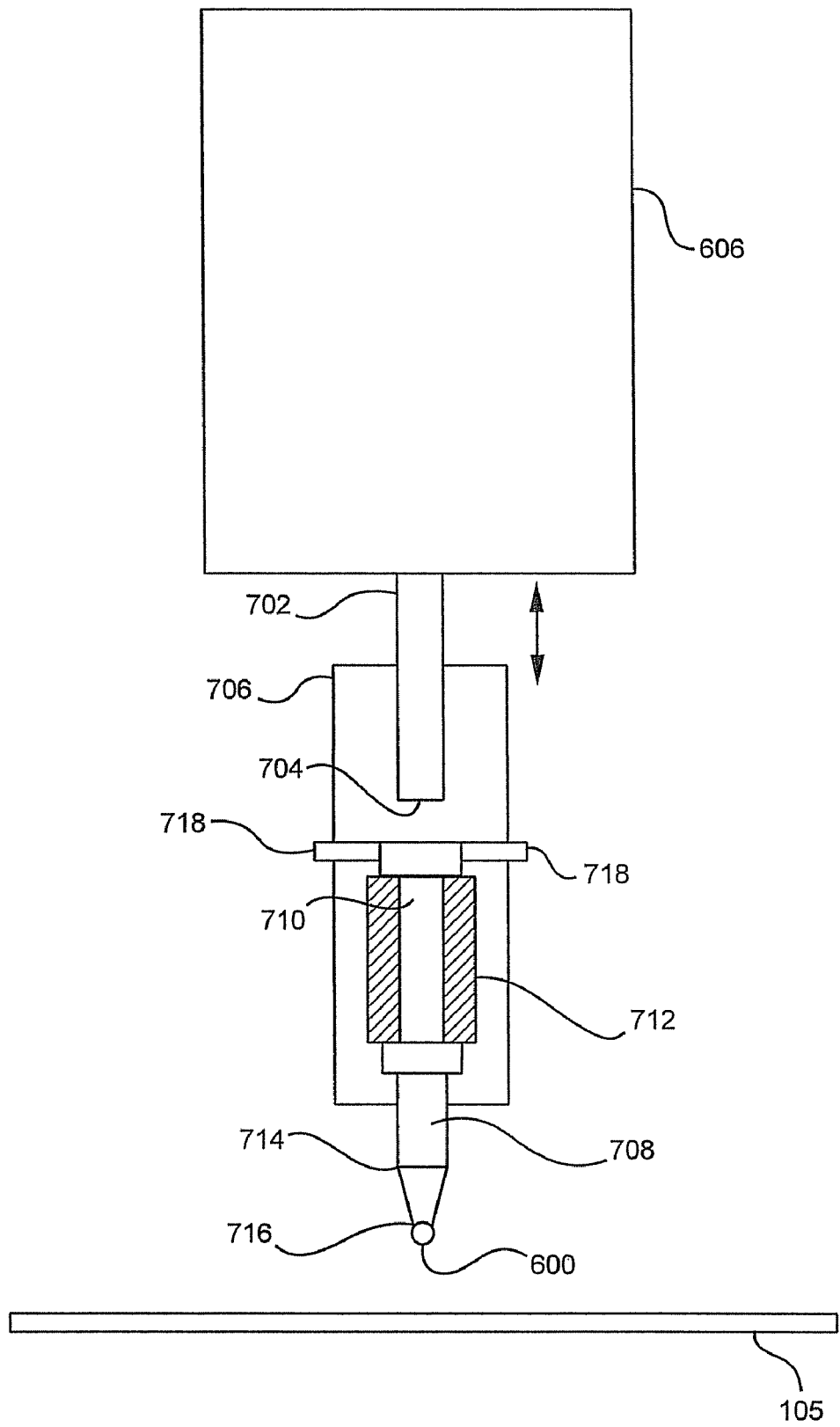
FIG. 7 is a block diagram that illustrates in greater detail how a voice coil actuator can be connected to a score wheel within the scoring device shown in FIG. 6 in accordance with one embodiment of the present invention

Referring to FIG. 7, there is a cross-sectional block diagram illustrating in more detail of an example about how the voice coil actuator 606 can be connected to the score wheel 600 in accordance with the present invention. In this example, the voice coil actuator 606 has a first shaft 702 extending therefrom with an end 704 that is secured to a coupling 706 within which a second shaft 708 is secured and where the second shaft 708 has a first end 710 with a portion of which is surrounded by an air bushing pivot 712 and where the second shaft 708 has a second end 714 on which there is attached a bearing 716 that is in turn attached to the score wheel 600. The bearing 716 (e.g., jeweled bearing 716) functions to provide a low friction and wear resistant support for the score wheel 600.

As shown, the voice coil actuator 606 moves the score wheel 600 in a direction perpendicular to the surface of the glass sheet 105. The voice coil actuator 606 also uses velocity control servos to make-sure the score wheel 600 has a soft landing onto the glass sheet 105. This helps to eliminate the problematic large glass chips that can be created when the score wheel 600 penetrates the glass sheet 105. Once the score wheel 600 has penetrated the glass sheet 105, the control of the voice coil actuator 606 can be switched to a force control mode where a substantially constant scoring force is maintained while the score wheel 600 scores the glass sheet 105. Plus, at the end of the score process, the voice coil actuator 606 can have the cutter force changed (up or down) to ensure a proper and consistent vent is created to help assist with the propagation of the crack.

This setup also utilizes the air bushing pivot 712 (e.g., porous graphite air bushing pivot 712) which allows the second shaft 708 to pivot freely in a plane parallel with the direction of the cut so as to help avoid any over constraining during the scoring process. In this embodiment, the stop pins 718 limit this pivot motion to +/−10 degrees of motion. In addition, the air bushing pivot 712 provides a very stiff, zero friction pivot that is self-cleaning (due to the supply of positive compressed air) and thus helps reduce the problematical stiction which occurs when the score wheel 600 sticks to the glass sheet 105 (note: the voice coil actuator 606 if desired could have a force feedback system which could help an operator track and analyze changes in the ribbon characteristics such as the shape, the motion etc. . . . of the glass sheet 105).

From the foregoing, it should be readily appreciated by those skilled in the art that a glass manufacturing system 100 can incorporate and use the scoring device 154 which applies a constant force while scoring a glass sheet 105 (e.g., bowed glass sheet 105, flat glass sheet 105). In addition, it should be appreciated that any type of glass manufacturing system that draws molten glass to make a glass sheet can also incorporate and use the scoring device 154. In fact, the scoring device 154 could be used to score other types of materials in addition to a glass sheet like a plexi-glass sheet etc. . . . . . Accordingly, the scoring device 154 of the present invention should not be construed in a limited manner.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A method for producing a glass sheet, said method comprising the steps of:
 melting batch materials to form molten glass and processing the molten glass to form the glass sheet;
 drawing the glass sheet using a fusion draw machine;
 routing the glass sheet along a nosing device; and scoring the glass sheet using a scoring device comprising a score wheel, a first linear motor/actuator configured to move said score wheel in an X-direction along a side of the glass sheet, a second linear motor/actuator configured to move said score wheel in a Y-direction towards the side of the glass sheet, a first actuator and a ranging sensor, the scoring comprising:
  obtaining positional information from the ranging sensor about a location of the side of the glass sheet;
  operating said second linear motor/actuator to move said first actuator and said score wheel in the Y-direction using said positional information from said ranging sensor;

operating said first actuator to move said score wheel relative to said second linear motor/actuator further in the Y-direction; and wherein said score wheel applies a constant force to the side of the glass sheet during the scoring.

2. The method of claim 1, wherein said nosing device is a conformable nosing device, the method further comprising configuring the nosing device to have a bowed shape that substantially conforms to a bowed shape of the glass sheet.

3. The method of claim 1, wherein said first actuator is a low friction pneumatic actuator.

4. The method of claim 1, wherein said first actuator is a voice coil actuator.

5. The method of claim 4, wherein said voice coil actuator further comprises a force feedback system, the method further comprising using the force feedback system to monitoring a shape or position of the glass sheet.

6. The method of claim 4, further comprising switching an operating mode of the voice coil actuator from velocity control to force control after the score wheel contacts the glass sheet.

7. The method of claim 4, further comprising varying the force applied to the glass sheet by the score wheel at the end of the scoring.

* * * * *